United States Patent
Okada

(10) Patent No.: US 6,916,169 B2
(45) Date of Patent: Jul. 12, 2005

(54) DRIVE APPARATUS FOR INJECTION MOLDING MACHINE

(75) Inventor: Norihito Okada, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 393 days.

(21) Appl. No.: 09/790,729

(22) Filed: Feb. 23, 2001

(65) Prior Publication Data

US 2001/0018079 A1 Aug. 30, 2001

(30) Foreign Application Priority Data

Feb. 28, 2000 (JP) ........................................ 2000-050756

(51) Int. Cl.⁷ ............................................. B29C 45/66
(52) U.S. Cl. ...................... 425/593; 74/89.23; 100/286; 425/451.6
(58) Field of Search ............................. 425/593, 451.6; 100/281, 286; 74/89.23, 106, 89.34

(56) References Cited

U.S. PATENT DOCUMENTS

| | | | |
|---|---|---|---|
| 3,908,968 A | * | 9/1975 | Bielfeldt et al. .............. 366/78 |
| 4,540,359 A | * | 9/1985 | Yamazaki ................... 425/593 |
| 5,306,136 A | | 4/1994 | Oomori et al. |
| 5,540,495 A | | 7/1996 | Pickel |
| 5,645,868 A | | 7/1997 | Reinhart |
| 5,879,597 A | | 3/1999 | Urbanek |
| 6,364,650 B1 | * | 4/2002 | Emoto ........................ 425/145 |

FOREIGN PATENT DOCUMENTS

| | | |
|---|---|---|
| EP | 0 965 32 A1 | 12/1999 |
| JP | 62-128722 | 6/1987 |
| JP | 04-113821 | 4/1992 |

OTHER PUBLICATIONS

Patent Abstracts of Japan, vol. 15, No. 267, Jul. 8, 1991 & JP 03 090327 A.

* cited by examiner

Primary Examiner—James P. Mackey
(74) Attorney, Agent, or Firm—Squire, Sanders & Dempsey L.L.P.

(57) ABSTRACT

A drive apparatus for an injection molding machine comprises a drive means, a rotation transmission shaft, a screw shaft, a nut and a driven member. The rotation transmission shaft is connected to the drive means and rotated by the drive means. The screw shaft is rectilinearly movably disposed, surrounds the rotation transmission shaft, and engages with an outer cylindrical surface of the rotation transmission shaft on an inner cylindrical surface of the screw shaft. The nut is threadably engaged with the screw shaft. The driven member is disposed on the screw shaft. In this apparatus, the rotation generated by the drive means is transmitted to the screw shaft and the screw shaft is advanced and retracted not to rotate the nut. Therefore, the inertia of the drive apparatus becomes small and the response of mold opening/closing becomes rapid when the drive mean is driven.

35 Claims, 7 Drawing Sheets

DRIVE APPARATUS FOR INJECTION MOLDING MACHINE

BACKGROUND OF THE INVENTION

The invention relates to a drive apparatus for an injection molding machine.

Conventionally, in an injection molding machine, resin heated and melted in a heating cylinder is injected into a cavity of a mold apparatus under high pressure so that the cavity is filled with the molten resin. The molten resin is then cooled and solidified so as to obtain a molded article.

The mold apparatus comprises a stationary mold and a movable mold. The movable mold is advanced and retracted by a mold clamping apparatus so that the movable mold is attached to and separated from the stationary mold, to thereby perform mold closing, mold clamping and mold opening.

The mold clamping apparatus has a toggle mechanism to advance and retract the movable mold. The toggle mechanism is driven by an electric motor or a servomotor in a drive section.

FIG. 1 is a sectional view of a drive section of a conventional mold clamping apparatus.

In FIG. 1, the servomotor 31 as a drive means has a motor case which comprises a plate-shaped first flange 54 to attach the servomotor 31 to a toggle support not illustrated, a plate-shaped second flange 55 spaced apart from the first flange 54, and a cylindrical frame 62 disposed between the first flange 54 and the second flange 55. Inside the motor case, a rotor 60 and a stator 61 are disposed.

A hollow output shaft 50 is rotatably disposed relative to the motor case. Its rear end (leftward end in FIG. 1) is supported by a thrust bearing 57 while its front end (rightward end in FIG. 1) is supported by a thrust bearing 58. By these thrust bearings 57 and 58, the output shaft 50 is supported in a thrust direction and is rotatably supported in a radial direction. To rotate the output shaft 50, the stator 61 is fixed to the frame 62 and the rotor 60 is fixed to the output shaft 50. A coil 45 is mounted to the stator 61. Bolts 59 connect the first flange 54 and the second flange 55. By tightening the bolts 59, the frame 62 is pressed against the first flange 54 by the second flange 55. An encoder 48 is attached to the second flange 55 via a bracket 47.

At the rear end (leftward end in FIG. 1) of the output shaft 50, a fixing nut 46 is threadably engaged with it. At the front end (rightward end in FIG. 1) of the output shaft 50, a nut 51 is fixed to it by bolts 53. Therefore, by tightening the bolts 53, the thrust bearings 57 and 58 are pressed by the fixing nut 46 and the nut 51.

A screw shaft 63 extends inside the output shaft 50, engages threadably with the nut 51, and then further extends forward (rightward in FIG. 1) to a cross head not illustrated. Its front end is connected to the cross head on which a toggle mechanism is disposed. The cross head is prevented from rotating by a guide bar not illustrated. A drive section comprises the servomotor 31, the output shaft 50, the nut 51, the screw shaft 63 and the cross head.

Consequently, when a current of electricity is supplied to the coil 45 and the servomotor 31 is driven, the rotor 60 is rotated. The rotation is sequentially transmitted to the output shaft 50 and the nut 51. By the engagement of the nut 51 and the screw shaft 63, the rotation (in the direction of A in FIG. 1) of the nut 51 is transformed to rectilinear motion (in the direction of B in FIG. 1) of the screw shaft 63. Thus, the screw shaft 63 and the cross head are advanced and retracted (moved rightward and leftward in FIG. 1) in a stroke Sb.

When the screw shaft 63 is advanced (moved rightward in FIG. 1), the cross head is also advanced so that the toggle mechanism extends and advances the movable platen not illustrated, to thereby perform mold closing and mold clamping. When the screw shaft 63 is retracted (moved leftward in FIG. 1), the cross head is also retracted so that the toggle mechanism contracts the movable platen, to thereby perform mold opening.

However, in the above conventional drive section, the output shaft 50 and the nut 51 are rotated to advance and retract the screw shaft 63 so that its inertia is extremely large. Therefore, when the servomotor 31 is driven, the response of mold opening/closing is delayed so that molding cycle becomes long. Further, vibration is caused in the drive section when the servomotor 31 is started and stopped.

Accordingly, a mold clamping apparatus with a fixed nut and a rotated screw shaft is provided.

FIG. 2 is a sectional view of a drive section of another conventional mold apparatus. With respect to the elements which have the same structure as the mold clamping apparatus in FIG. 1, the explanations of them are omitted by giving the same numeral to them.

In this apparatus, the hollow output shaft 50 is rotatably disposed relative to a motor case 64. A spline nut 68 is disposed about the center of an inner cylindrical surface of the output shaft 50. The nut 51 is fixed to a front end (rightward end in FIG. 2) of the motor case 64.

A screw shaft unit 65 extends inside the output shaft 50 and the nut 51. A cross head not illustrated is attached to the screw shaft unit 65 at its front end (rightward end in FIG. 2) via bearings not illustrated. In the screw shaft unit 65, a spline portion 66 is formed in its rear (leftward in FIG. 2) while a screw shaft portion 67 is formed in its front (rightward in FIG. 2). The spline portion 66 engages slidably and matably with the spline nut 68. The screw shaft portion 67 engages threadably with the nut 51. A drive section comprises the servomotor 31, the output shaft 50, the nut 51, the screw shaft unit 65 and the cross head.

Consequently, when the servomotor 31 is driven and the rotor 60 is rotated, the rotation is sequentially transmitted to the output shaft 50, the spline nut 68 and the screw shaft unit 65. By engagement of the nut 51 and the screw shaft portion 67, the rotation of the screw shaft unit 65 is transformed to rectilinear motion. Thus, the screw shaft unit 65 and the cross head are advanced and retracted (moved rightward and leftward in FIG. 2).

In this conventional apparatus, the inertia of the drive section becomes small because the nut 51 is not rotated to advance and retract the screw shaft unit 65. Therefore, when the servomotor 31 is driven, the response of mold opening/closing becomes rapid so that molding cycle becomes short. Further, the vibration in the drive section is prevented when the servomotor 31 is started and stopped.

However, the spline portion 66 and the screw shaft portion 67 are disposed in series along the screw shaft unit 65 in an axial direction to transmit the rotation of the output shaft 50 to the screw shaft portion 67. Therefore, the spline portion 66 makes the size of the drive section large.

SUMMARY OF THE INVENTION

The object of the invention is to provide a drive apparatus which can make a molding cycle short, which can prevent vibration when a drive means is started and stopped, and which can make the size of the drive section small.

To achieve the above object, a drive apparatus for an injection molding machine of the invention comprises a drive means, a rotation transmission shaft, a screw shaft, a nut and a driven member. The rotation transmission shaft is connected to the drive means and rotated by the drive means. The screw shaft is rectilinearly movably disposed surrounding the rotation transmission shaft, and engaged with an outer cylindrical surface of the rotation transmission shaft on an inner cylindrical surface of the screw shaft. The nut is threadably engaged with the screw shaft. The driven member is disposed on the screw shaft.

In this apparatus, the rotation generated by the drive means is transmitted to the screw shaft so that the screw shaft is advanced and retracted, and the nut is not rotated to advance and retract the screw shaft. Therefore, the inertia of the drive apparatus becomes small.

Therefore, when the drive means is driven, the response of mold opening/closing becomes rapid so that the molding cycle becomes short. Further, vibration in the drive apparatus is prevented when the drive means is started and stopped.

Moreover, the spline portion and the screw shaft portion are not disposed in series along the screw shaft in an axial direction to transmit the rotation to the screw shaft so that the length of the screw shaft in the axial direction becomes short. Therefore, the size of the drive apparatus becomes small.

In another drive apparatus for an injection molding machine of the invention, the drive member further supports the screw shaft rotatably.

A further drive apparatus for an injection molding machine of the invention further comprises a hollow output shaft which transmits rotation generated by the drive means. The output shaft surrounds the rotation transmission shaft and the screw shaft.

In this apparatus, because the rotation transmission shaft and the screw shaft are surrounded by the drive means so that the drive means, the rotation transmission shaft and the screw shaft are overlapped, the size of the drive apparatus becomes small.

Another drive apparatus for an injection molding machine of the invention comprises a drive means, a first rotation member, a second rotation member, a nut and a driven member. The first rotation member is connected to the drive means and rotated by the drive means. The second rotation member is disposed rectilinearly movably. A nut is threadably engaged with a screw shaft portion of the second rotation member. The driven member is disposed on the second rotation member. An inner cylindrical surface of the second rotation member is engaged with an outer cylindrical surface of the first rotation member.

In this apparatus, the rotation generated by the drive means is transmitted to the first rotation member so that the first rotation member is advanced and retracted, and the nut is not rotated to advance and retract the first rotation member. Therefore, the inertia of the drive apparatus becomes small.

Therefore, when the drive means is driven, the response of mold opening/closing becomes rapid so that the molding cycle becomes short. Further, vibration in the drive apparatus is prevented when the drive means is started and stopped.

Moreover, the spline nut portion and the screw shaft portion are not disposed in series along the second rotation member in an axial direction of to transmit the rotation to the first rotation member so that the length of the screw shaft in the axial direction becomes short. Therefore, the size of the drive apparatus becomes small.

Another drive apparatus for an injection molding machine of the invention further comprises a hollow output shaft which transmits rotation generated by the drive means and which surrounds the first and second rotation members.

In this apparatus, because the first and second rotation members are surrounded by the output shaft so that the output shaft and the first and second rotation members are overlapped, the size of the drive apparatus becomes small.

Another drive apparatus for an injection molding machine of the invention comprises a drive means, a first rotation member, a second rotation member, a nut and a driven member. The first rotation member is connected to the drive means and rotated by the drive means. The second rotation member is disposed rectilinearly movably. A nut is threadably engaged with a screw shaft portion of the second rotation member. The driven member is disposed on the second rotation member. An inner cylindrical surface of the first rotation member is engaged with an outer cylindrical surface of the second rotation member at the screw shaft portion of the second rotation member.

In this apparatus, because the screw shaft portion and the engagement of the first and second rotation members are overlapped, the size of the drive apparatus becomes small.

Other and further objects, features and advantages of the invention will appear more completely from the following description.

BRIEF DESCRIPTION OF THE DRAWINGS

The invention disclosed herein will be better understood with reference to the following drawings of which.

DESCRIPTION OF PREFERRED EMBODIMENTS

A first embodiment of the invention will next be described in detail with reference to the drawings.

Figure 1:
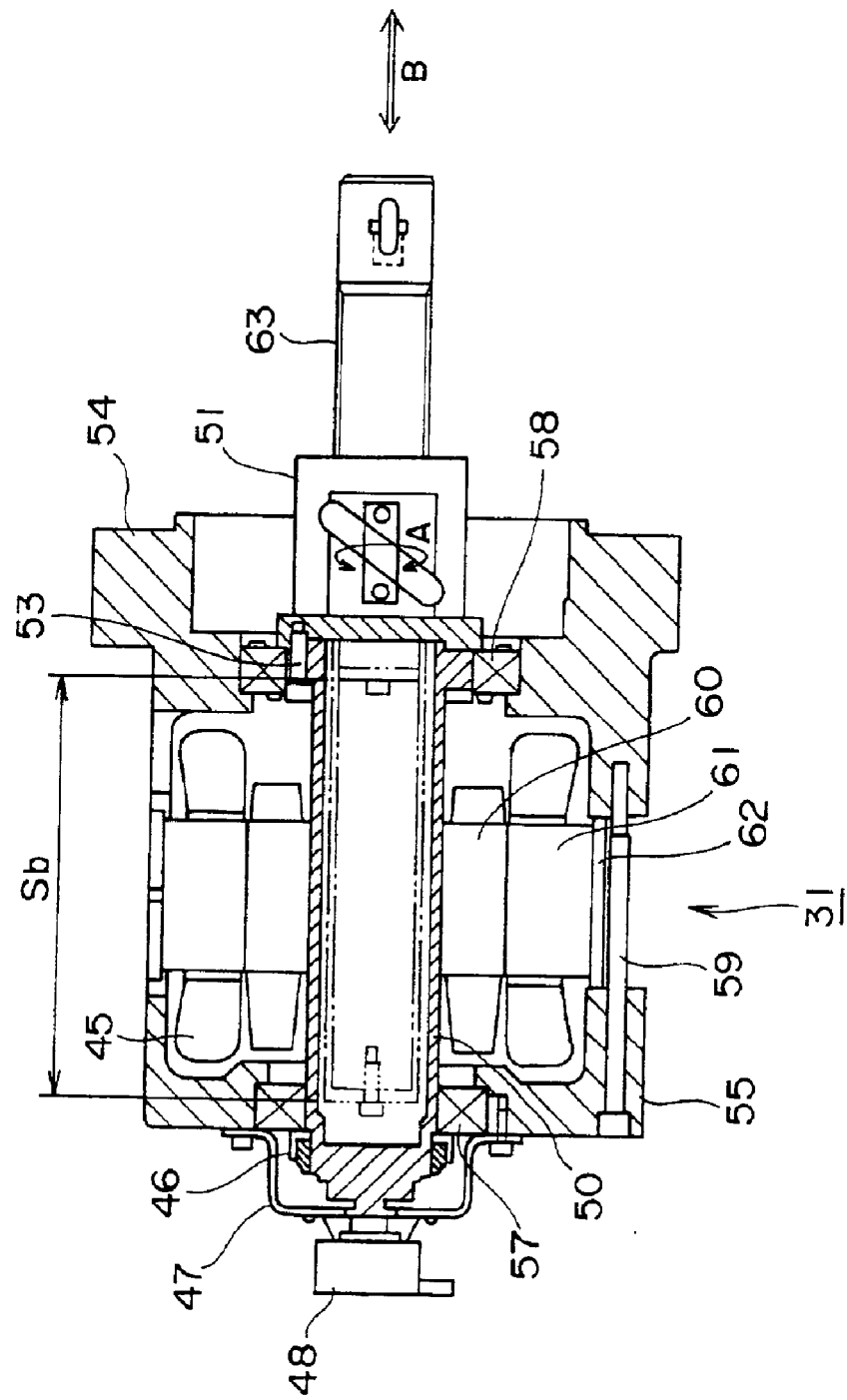
FIG. 1 is a sectional view of a drive section of a conventional mold clamping apparatus.
Figure 2:
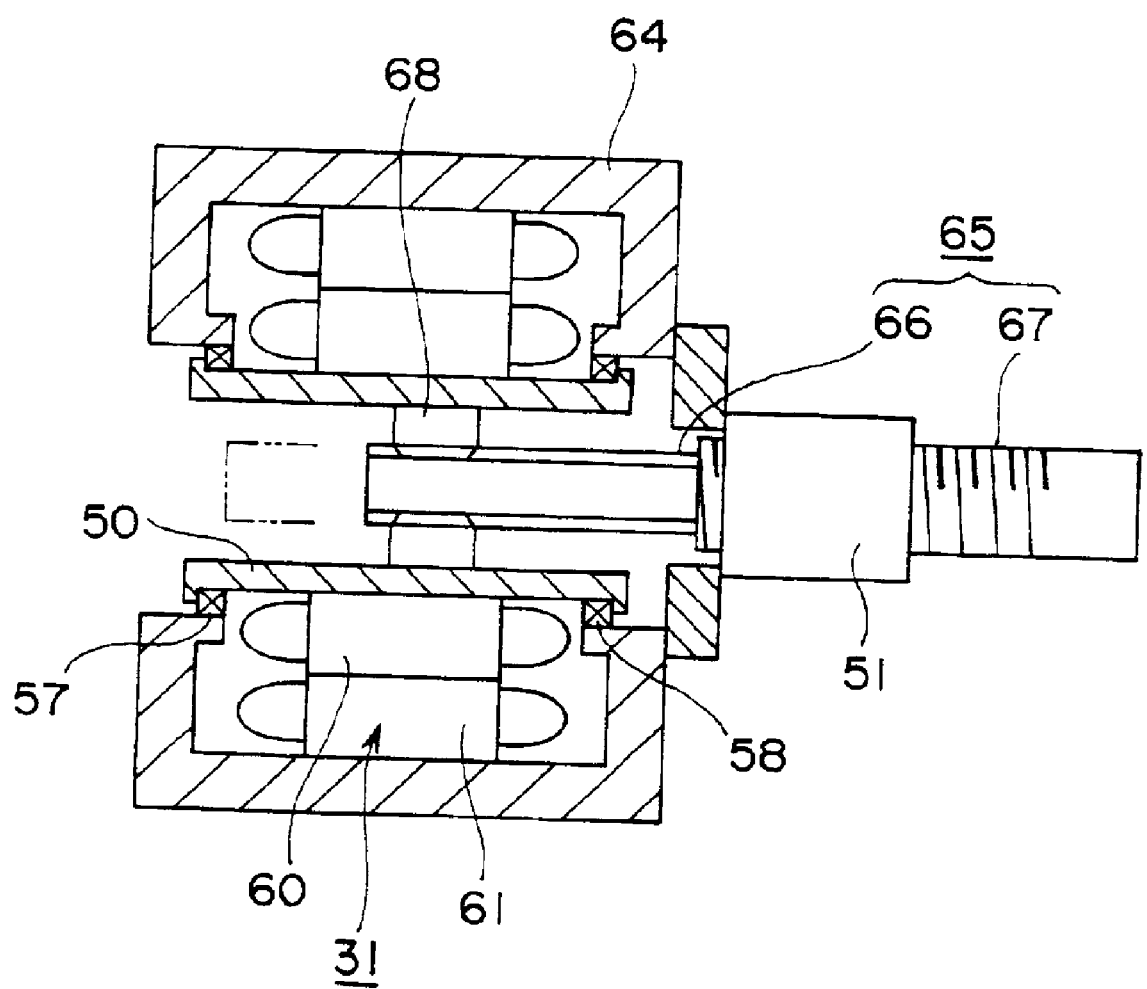
FIG. 2 is a sectional view of a drive section of another conventional mold clamping apparatus.
Figure 3:
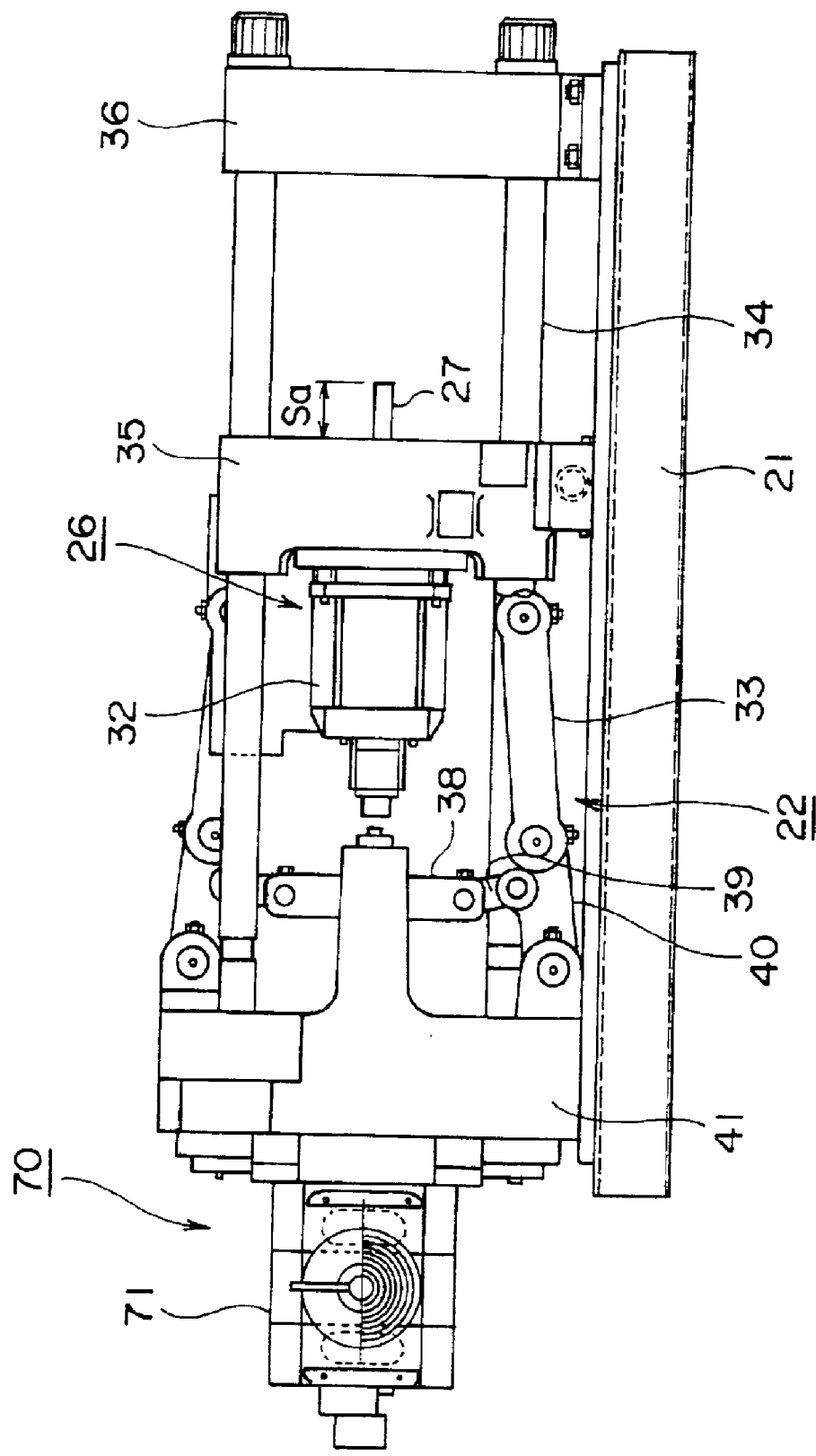
FIG. 3 is a schematic view of a mold clamping apparatus according to a first embodiment of the invention.

FIG. 3 is a schematic view of a mold clamping apparatus according to the first embodiment of the invention.

In FIG. 3, a stationary platen 36 mounted on a frame 21. A toggle support 41 as a base plate is movable relative to the frame 21 and spaced apart from the stationary platen 36. Tie rods 34 connect the stationary platen 36 and the toggle support 41. A movable platen 35 faces on the stationary platen 36 and is movable rectilinearly along the tie rods 34. A stationary mold not illustrated can be attached to the stationary platen 36 on a side which faces on the movable platen 35. A movable mold not illustrated can be attached to the movable platen 35 on a side which faces on the stationary platen 36. A mold apparatus comprises the stationary mold and the movable mold.

At a rear end (leftward end in FIG. 3) of the movable platen 35, an ejector pin feed apparatus 26 is disposed to project ejector pins not illustrated when ejecting a molded article from the mold. In the ejector pin feed apparatus 26, a servomotor 32 is disposed as a drive means for the ejector pins. An ejector rod 27 is advanced and retracted (moved rightward and leftward in FIG. 3) along a stroke Sa by the servomotor 32.

A toggle mechanism 22 is disposed between the movable platen 35 and the toggle support 41. At a rear end (leftward end in FIG. 3) of the toggle support 41, a drive section 70 is disposed as a drive apparatus for an injection molding machine. In the drive section 70, a servomotor 71 is disposed as a drive means for mold clamping. When the servomotor 71 is driven, a cross head 38 as a driven member is advanced and retracted (moved rightward and leftward in FIG. 3) so that the toggle mechanism 22 is operated and the movable platen 35 is sequentially advanced (moved rightward in FIG. 3) to thereby perform mold closing and mold clamping of the mold apparatus. A clamping force is a product of a thrust force generated by the servomotor 71 and toggle magnification. In this embodiment, the clamping force is generated by the toggle mechanism 22. However, the thrust force generated by the servomotor 71 can be directly transmitted to the movable platen 35 for a clamping force without the toggle mechanism 22.

The toggle mechanism 22 comprises toggle levers 39, toggle levers 40 and toggle arms 33. The toggle levers 39 are swingably supported relative to the cross head 38. The toggle levers 40 are swingably supported relative to the toggle support 41. The toggle levers 39 are linked with the toggle levers 40. The toggle arms 33 are swingably supported relative to the movable platen 35. The toggle levers 40 are linked with the toggle arms 33.

The drive section 70 is explained next.

Figure 4:
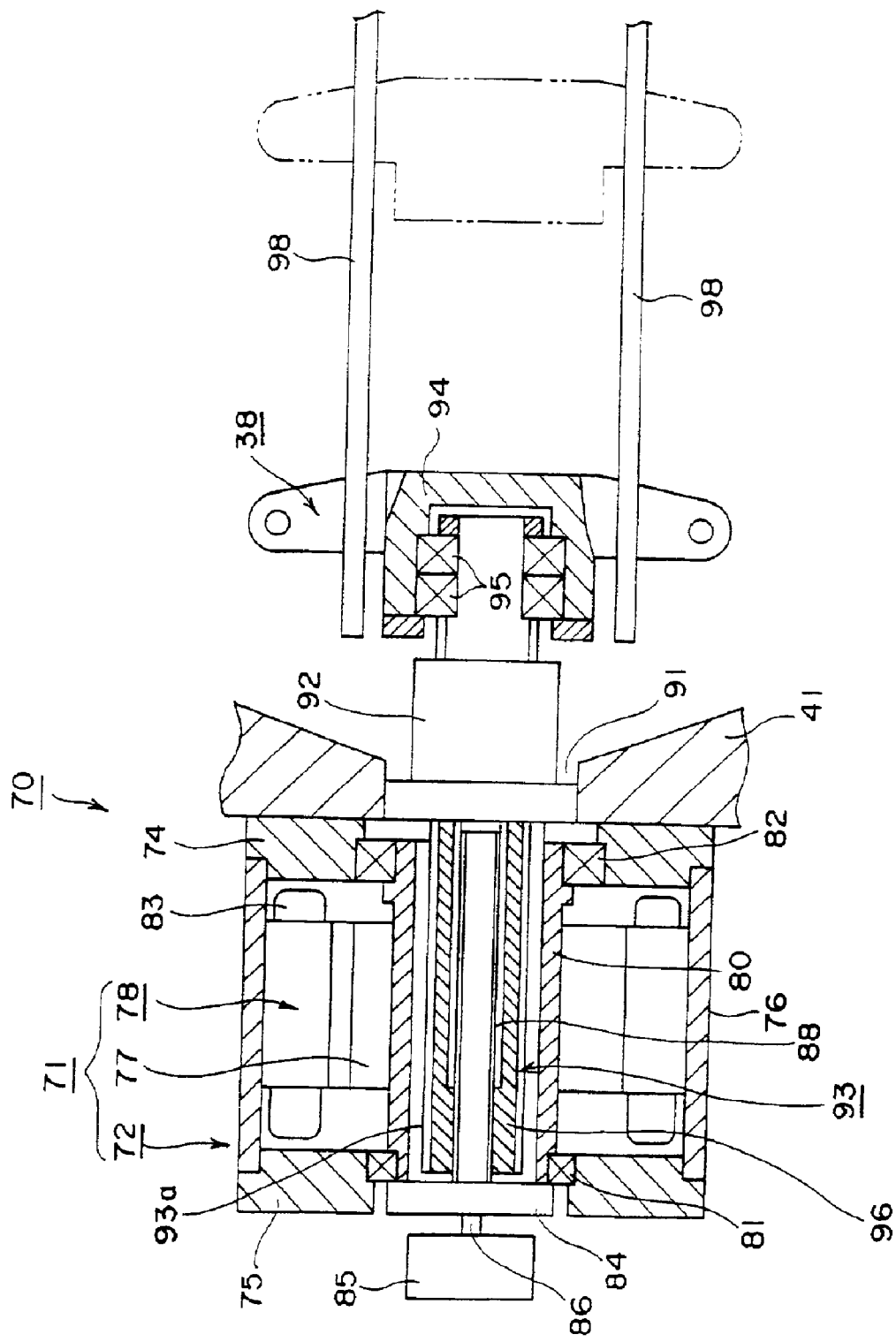
FIG. 4 is a sectional view of a drive section of a mold clamping apparatus according to a first embodiment of the invention.

FIG. 4 is a sectional view of the drive section 70 of the mold clamping apparatus according to the first embodiment of the invention.

In FIG. 4, the servomotor 71 comprises a motor case 72, a rotor 77 and a stator 78 disposed inside the motor case 72. The motor case 72 comprises a plate-shaped first flange 74 to attach the servomotor 71 to the toggle support 41, a plate-shaped second flange 75 spaced apart from the first flange 74, and a cylindrical frame 76 disposed between the first flange 74 and the second flange 75. An electric motor can be served as a drive means instead of the servomotor 71.

A hollow output shaft 80 is rotatably disposed relative to the motor case 72. Its rear end (leftward end in FIG. 4) is supported by a thrust bearing 81 while its front end (rightward end in FIG. 4) is supported by a thrust bearing 82. By these thrust bearings 81 and 82, the output shaft 80 is supported in a thrust direction and is rotatably supported in a radial direction. To rotate the output shaft 80, the stator 78 is fixed to the frame 76 and the rotor 77 is fixed to the output shaft 80. A coil 83 is mounted to the stator 78. Bolts not illustrated connect the first flange 74 and the second flange 75. By tightening the bolts, the frame 76 is pressed against the first flange 74 by the second flange 75.

A spline flange 84 is fixed at the rear end (leftward end in FIG. 4) of the output shaft 80. A spline shaft 88 as a rotation transmission shaft and a first rotation member projects from the spline flange 84 and extends forward (rightward in FIG. 4) to the front end of the output shaft 80. The spline shaft 88 is as long as the output shaft 80. The output shaft 80 surrounds the spline shaft 88. A shaft 86 also projects from the spline flange 84. The shaft 86 is surrounded by an encoder 85 as a means for detecting rotation speed. The encoder 88 detects rotation speed of the spline shaft 88. The rotation speed is transmitted to a control apparatus not illustrated.

In the toggle support 41, a hole 91 is disposed at a correspondent position with the output shaft 80. Into the hole 91, a nut 92 is fixedly fitted. The nut 92 threadably engages with a cylindrical screw shaft 93 as a second rotation member. The screw shaft 93 including a screw shaft portion 93*a* is rotatably disposed inside the output shaft 80 and movable rectilinearly. The screw shaft 93 is as long as the output shaft 80 and extends throughout the output shaft 80 when the screw shaft 93 is located at the most rear position (at the most leftward position in FIG. 4). The screw shaft 93 surrounds the spline shaft 88. At a rear portion (leftward portion in FIG. 4) of the screw shaft 93, a spline nut portion 96 is formed at a predetermined area along an axis of the screw shaft 93. An inner cylindrical surface of the spline nut portion 96 is slidably and matably engaged with an outer cylindrical surface of the spline shaft 88. A rotation transmission section comprises the spline shaft 88 and the spline nut portion 96.

The cross head 38 is disposed at a front end (rightward in FIG. 4) of the screw shaft 93. The front end of the screw shaft 93 is rotatably supported by a pair of bearings 95 inside of a bearing housing 94 in the center of the cross head 38. The cross head 38 is prevented from rotating by guide bars 98. The drive section comprises the cross head 38, the servomotor 71, the output shaft 80, the spline flange 84, the spline shaft 88, the nut 92 and the screw shaft 93.

Consequently, when a current of electricity is supplied to the coil 83 and the servomotor 71 is driven, the rotor 77 is rotated. The rotation is sequentially transmitted to the output shaft 80, the spline flange 84 and the spline shaft 88. The rotation of the spline shaft 88 is further transmitted to the screw shaft 93. By the engagement of the nut 92 and the screw shaft 93, the rotation of the screw shaft 93 is transformed to rectilinear motion. Thus, the screw shaft 93 and the cross head 38 are advanced and retracted (moved rightward and leftward in FIG. 4). A motion transformation section comprises the nut 92 and the screw shaft 93.

When the screw shaft 93 is advanced (moved rightward in FIG. 4), the cross head 38 is also advanced so that the toggle mechanism 22 illustrated in FIG. 3 extends and advances the movable platen 35, to thereby perform mold closing and mold clamping of the mold apparatus. When the screw shaft 93 is retracted (moved leftward in FIG. 4), the cross head 38 is also retracted so that the toggle mechanism 22 contracts the movable platen 35, to thereby perform mold opening of the mold apparatus.

In this embodiment, the servomotor 71 surrounds the spline shaft 88. Instead of it, however, a servomotor as a drive means disposed on a lateral side of the toggle support 41 and a pulley disposed at a rear end of the spline shaft 88 can also be applied. Rotation generated by the servomotor is transmitted to the spline shaft 88 via a belt and the pulley.

Since, in this manner, the rotation generated by the servomotor 71 is transmitted to the spline shaft 88 and the screw shaft 93 so that the screw shaft 93 is advanced and retracted, the nut 92 is not rotated to advance and retract the screw shaft 93. Therefore, the inertia of the drive section 70 becomes small. In this embodiment, the spline flange 84, the shaft 86, the spline shaft 88 and the screw shaft 93 are rotated while the output shaft 80 is rotated. With these rotating elements, the inertia of the drive section 70 is sufficiently small because the diameter of the above rotating elements is smaller than the nut 92.

Therefore, when the servomotor 71 is driven, the response of mold opening/closing becomes rapid so that molding cycle becomes short. Further, vibration in the drive section 70 is prevented when the servomotor 71 is started and stopped.

The spline nut portion 96 and the screw shaft portion 93a are not disposed in series along the screw shaft 93 in an axial direction to transmit the rotation of the output shaft 80 to the screw shaft portion 93a so that the length of the screw shaft 93 in the axial direction becomes short. Therefore, the size of the drive section 70 becomes small. Moreover, because the output shaft 80 surrounds the spline shaft 88 and the screw shaft 93 so that the output shaft 80, the spline shaft 88 and the screw shaft 93 are overlapped when the screw shaft 93 is located at the most rear position. Therefore, the size of the drive section 70 becomes small. Furthermore, sufficient room for the ejector pin feed apparatus 26 is made.

In this embodiment, the spline nut portion 96 is formed at the rear of the screw shaft 93. However, the spline nut potion 96 can also be formed over the entire length of the screw shaft 93. In this embodiment, the spline shaft 88 and the spline nut portion 96 used as a rotation transmission section. However, a key engagement can also be used.

A second embodiment of the invention will next be explained. With respect to the elements which have the same structure as the first embodiment, the explanations of them are omitted by giving the same numeral to them.

Figure 5:
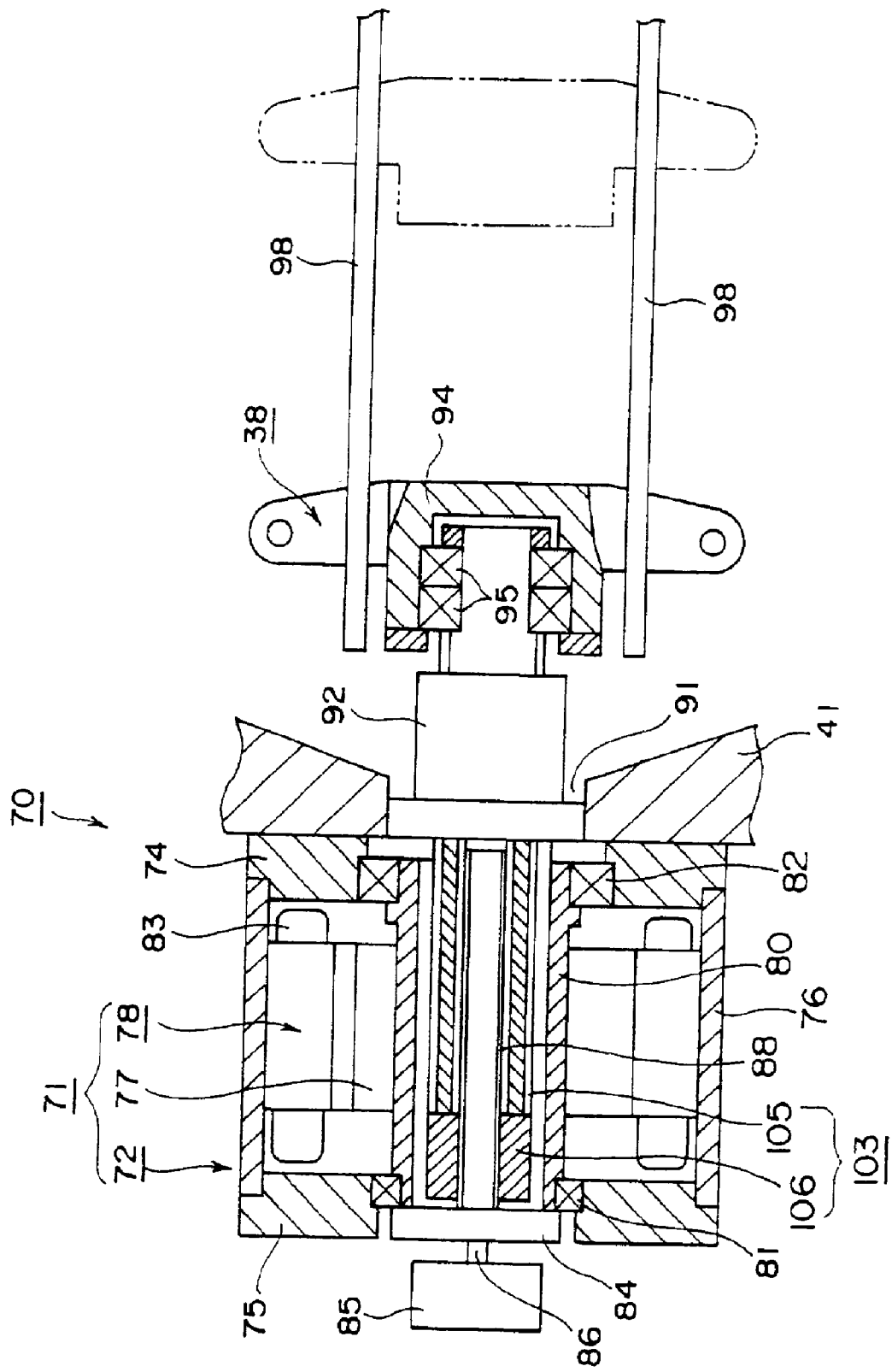
FIG. 5 is a sectional view of a drive section of a mold clamping apparatus according to a second embodiment of the invention.

FIG. 5 is a sectional view of a drive section of a mold clamping apparatus according to the second embodiment of the invention.

In this embodiment, a spline shaft 88 as a first rotation member and a rotation transmission shaft projects forward (rightward in FIG. 5) from a spline flange 84 and extends inside an output shaft 80. A screw shaft unit 103 as a second rotation member is rotatably and rectilinearly movably (leftward and rightward movably in FIG. 5) disposed extending inside the output shaft 80. The screw shaft unit 103 comprises a cylindrical screw shaft portion 105 and a spline nut 106 as an annular member. The spline nut 106 is attached to a rear end (left end in FIG. 5) of the screw shaft portion 105 by a means for fixing not illustrated such as bolts. An inner cylindrical surface of the spline nut 106 and an outer cylindrical surface of the spline shaft 88 are in slidable and matable engagement, namely, spline-engagement. Therefore, the screw shaft unit 103 is advanced and retracted (moved rightward and leftward in FIG. 7) upon rotation of the spline shaft 88. A rotation transmission section comprises the spline shaft 88 and the spline nut 106.

Because the output shaft 80 surrounds the spline shaft 88 and the screw shaft unit 103 so that the output shaft 80, the spline shaft 88 and the screw shaft unit 103 are overlapped when the screw shaft unit 103 is located at the most rear position. Therefore, the size of the drive section 70 becomes small.

A third embodiment of the invention will next be explained. With respect to the elements which have the same structure as the second embodiment, the explanations of them are omitted by giving the same numeral to them.

Figure 6:
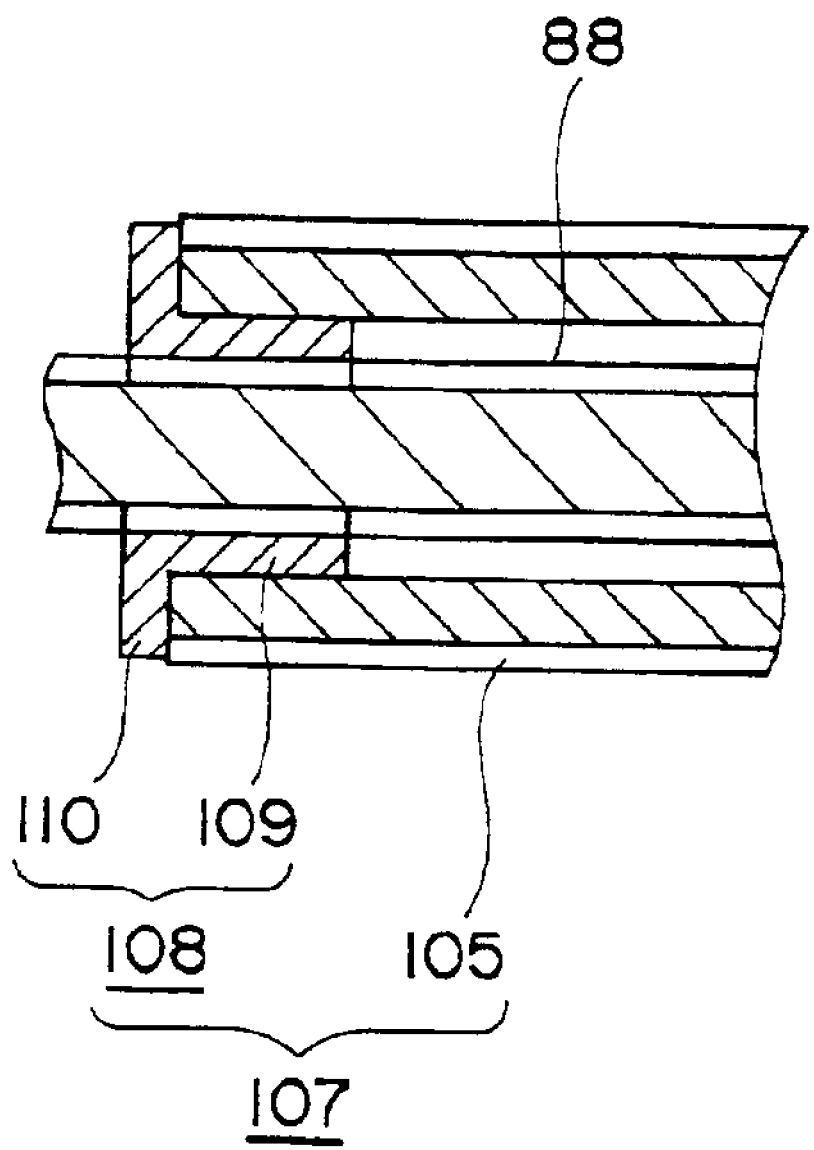
FIG. 6 is a partial sectional view of a drive section of a mold clamping apparatus according to a third embodiment of the invention.

FIG. 6 is a partial sectional view of a drive section of a mold clamping apparatus according to the third embodiment of the invention.

In this embodiment, a screw shaft unit 107 as a second rotation member is rotatably and rectilinearly movably disposed extending inside the output shaft. The screw shaft unit 107 comprises a cylindrical screw portion 105 and a spline nut 108 as an annular member. The spline nut 108 is attached to a rear end (left end in FIG. 6) of the screw shaft portion 105 by a means for fixing not illustrated such as bolts. An inner cylindrical surface of the spline nut 108 and an outer cylindrical surface of the spline shaft 88 are in slidable and matable engagement, namely, spline-engagement. Therefore, the screw shaft unit 107 is advanced and retracted upon rotation of the spline shaft 88. A rotation transmission section comprises the spline shaft 88 and the spline nut 108.

The spline nut 108 comprises a cylindrical part 109 extending inside the screw shaft portion 105 and a flange part 110 which outward radially projects from a rear end of the cylindrical part 109. Because the screw shaft portion 105 and the engagement of the spline shaft 88 and the spline nut 108 are overlapped at the cylindrical part 109 in an axial direction, the length of the screw shaft unit 107 becomes short.

Because the output shaft 80 surrounds the spline shaft 88 and the screw shaft unit 107 so that the output shaft 80, the spline shaft 88 and the screw shaft unit 107 are overlapped when the screw shaft unit 103 is located at the most rear position. Therefore, the size of the drive section 70 becomes small.

A forth embodiment of the invention will next be explained. With respect to the elements which have the same structure as the second embodiment, the explanations of them are omitted by giving the same numeral to them.

Figure 7:
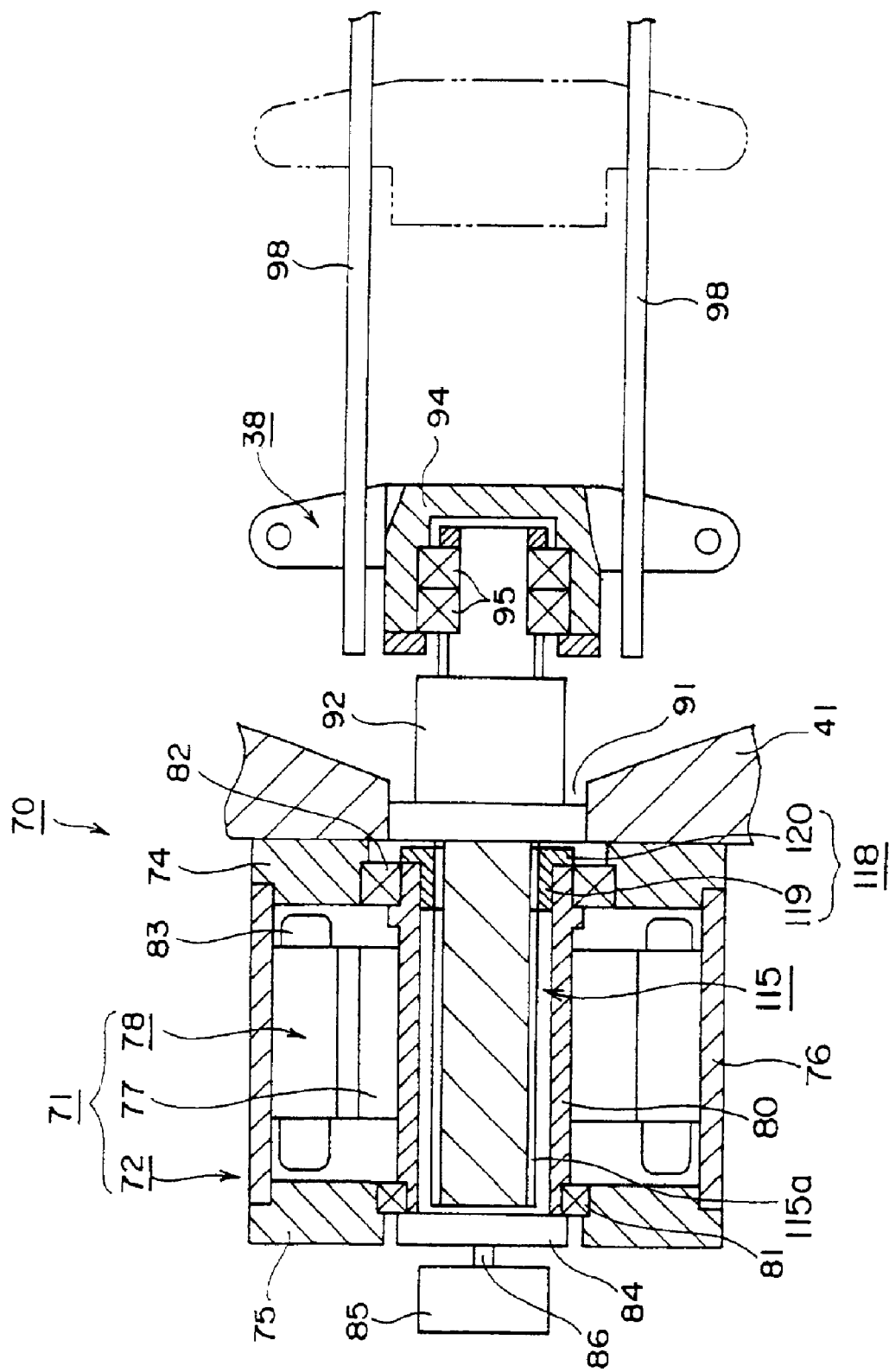
FIG. 7 is a sectional view of a drive section of a mold clamping apparatus according to a forth embodiment of the invention.

FIG. 7 is a sectional view of a drive section of a mold clamping apparatus according to the forth embodiment of the invention.

In this embodiment, a spline nut 118 as a first rotation member and a rotation transmission shaft is attached to a front end (right end in FIG. 7) of the output shaft 80 by a means for fixing not illustrated such as bolts. A solid screw shaft 115 with a screw shaft portion 115a as a second rotation member is rotatably and rectilinearly movably (leftward and rightward movably in FIG. 7) disposed extending inside the output shaft 80. The screw shaft 115 extends through the spline nut 118. An inner cylindrical surface of the spline nut 118 and an outer cylindrical surface of the screw shaft 115 are in slidable and matable engagement, namely, spline-engagement on the screw shaft portion 115a.

For this engagement, spline grooves are formed on the outer cylindrical surface of the screw shaft 115 overlapped with threads of the screw shaft 115. The spline grooves extend along an axial direction. Therefore, the screw shaft 115 is advanced and retracted (moved rightward and leftward in FIG. 7) upon rotation of the spline nut 118. A rotation transmission section comprises the screw shaft 115 and the spline nut 118.

The spline nut 118 comprises a cylindrical part 119 extending inside the output shaft 80 and a flange part 120 which outward radially projects from a front end of the cylindrical part 119. Because the screw shaft portion 115a and the engagement of the screw shaft 115 and the spline nut 118 are overlapped at the cylindrical part 119 in an axial direction, the length of the drive section 70 becomes short.

Because the output shaft 80 surrounds the spline nut 118 and the screw shaft 115 so that the output shaft 80, the spline nut 118 and the screw shaft 115 are overlapped when the screw shaft 115 is located at the most rear position. Therefore, the size of the drive section 70 becomes small.

In these embodiments, the drive section of the mold clamping apparatus is explained. However, the invention can also be applied to a drive section of an injection apparatus, a drive section of an ejector apparatus and so on.

The invention is not limited to the above described embodiments, numerous modifications and variations of the invention are possible in light of the spirit of the invention, and they are not excluded from the scope of the invention.

What is claimed is:

1. A drive apparatus for an injection molding machine comprising:
   (a) a drive means;
   (b) a rotation transmission shaft connected to the drive means and rotated by the drive means;
   (c) a screw shaft rectilinearly movably disposed surrounding the rotation transmission shaft, and engaged with an outer cylindrical surface of the rotation transmission shaft on an inner cylindrical surface of the screw shaft;
   (d) a nut connected to a frame member so as to be prevented from rotating and threadably engaged with the screw shaft; and
   (e) a driven member disposed on the screw shaft;
   wherein the driven member is translated in a direction transverse to rotation of the rotation transmission shaft through the motion of the drive means.

2. A drive apparatus for an injection molding machine according to claim 1, wherein the driven member supports the screw shaft rotatably.

3. A drive apparatus for an injection molding machine according to claim 1, further comprising a hollow output shaft which transmits rotation generated by the drive means and which surrounds the rotation transmission shaft and the screw shaft.

4. A drive apparatus for an injection molding machine comprising:
   (a) a drive means;
   (b) a first rotation member connected to the drive means and rotated by the drive means;
   (c) a second rotation member disposed rectilinearly movably;
   (d) a nut connected to a frame member so as to be prevented from rotating and threadably engaged with a screw shaft portion of the second rotation member;
   (e) a driven member disposed on the second rotation member; and
   (f) an inner cylindrical surface of the second rotation member engaged with an outer cylindrical surface of the first rotation member;
   wherein the driven member is translated in a direction transverse to rotation of the first rotation member through the motion of the drive means.

5. A drive apparatus for an injection molding machine according to claim 4, wherein the second rotation member surrounds the first rotation member.

6. A drive apparatus for an injection molding machine according to claim 4, wherein the driven member supports the second rotation member rotatably.

7. A drive apparatus for an injection molding machine according to claim 4, further comprising a hollow output shaft which transmits rotation generated by the drive means and which surrounds the first and second rotation members.

8. A drive apparatus for an injection molding machine according to claim 4, wherein the second rotation member comprises a screw shaft with a screw shaft portion.

9. A drive apparatus for an injection molding machine according to claim 4, wherein the second rotation member comprises a screw shaft portion and an annular member attached to the screw shaft portion.

10. A drive apparatus for an injection molding machine according to claim 9, wherein the annular member comprises a cylindrical part extending inside the screw shaft portion and a flange part which outward radially projects from an end of the cylindrical part.

11. A drive apparatus comprising:
    a frame member;
    a rotation transmission shaft extending along and centrally about an axis of rotation and rotatably mounted to the frame member;
    a screw shaft having an outer cylindrical surface, coaxially disposed about the rotation transmission shaft, having a hole having a first opening on a first radial surface of the screw shaft and disposed centrally about the axis, and slidably engaged to the rotation transmission shaft inside the hole, so that, upon rotation of the rotation transmission shaft, the rotation transmission shaft and the screw shaft rotate simultaneously about the axis; and
    a motion transformation member connected to the frame member so as to be prevented from rotating about the axis, and having a bore disposed centrally about the axis so as to threadably engage with the outer cylindrical surface of the screw shaft inside the bore, so that the screw shaft is advanced and retracted when being rotated through the motion of the rotation transmission shaft.

12. A drive apparatus according to claim 11, further comprising a motor fixedly connected to the frame member and operative to rotate the rotation transmission shaft.

13. A drive apparatus comprising:
    a frame member;
    a rotation transmission shaft extending along and centrally about an axis of rotation and rotatably mounted to the frame member;
    a screw shaft having an outer cylindrical surface, coaxially disposed about the rotation transmission shaft, having a hole having a first opening on a first radial surface of the screw shaft and disposed centrally about the axis, and slidably engaged to the rotation transmission shaft inside the hole, so that, upon rotation of the rotation transmission shaft, the rotation transmission shaft and the screw shaft rotate simultaneously about the axis; and
    a motion transformation member connected to the frame member so as to be prevented from rotating about the axis, and having a bore disposed centrally about the axis so as to threadably engage with the outer cylindrical surface of the screw shaft inside the bore, so that the screw shaft is advanced and retracted when being rotated;
    further comprising a motor fixedly connected to the frame member and operative to rotate the rotation transmission shaft; and
    wherein the motor has a stator fixedly mounted to the motor, a rotor and a hollow output shaft coaxially and rotatably disposed about the rotation transmission shaft, and the rotation transmission shaft is fixed to the hollow output shaft and disposed inside the hollow output shaft, so that the rotation transmission shaft and the hollow output shaft rotate simultaneously about the axis upon activation of the motor.

14. A drive apparatus according to claim 11, wherein the hole of the screw shaft is defined by an inner cylindrical surface which extends into the screw shaft along the axis from the first radial surface, and the screw shaft includes inner splines extending along the axis on the inner cylindrical surface of the hole, and the rotation transmission shaft includes outer splines along the axis on an outer surface thereof, the inner splines of the screw shaft and the outer splines of the rotation transmission shaft being in slidable and matable engagement with each other.

15. A drive apparatus according to claim 14, wherein the inner splines of the screw shaft are formed on the inner cylindrical surface of the hole near the first radial surface of the screw shaft.

16. A drive apparatus according to claim 11, wherein the outer cylindrical surface of the screw shaft is formed with exterior spiral threads, and the bore of the motion transformation member is defined by an interior surface formed with interior spiral threads, the exterior spiral threads of the screw shaft and the interior spiral threads of the motion transmission member being in matable engagement with each other.

17. A drive apparatus according to claim 11, wherein the hole extends through the screw shaft and has a second opening on a second radial surface disposed opposite the first radial surface.

18. A drive apparatus according to claim 11, wherein the motion transformation member is fixed to the frame member.

19. A drive apparatus comprising:
a frame member;
a rotation transmission shaft extending along and centrally about an axis of rotation and rotatably mounted to the frame member;
a screw shaft having an outer cylindrical surface, coaxially disposed about the rotation transmission shaft, having a hole having a first opening on a first radial surface of the screw shaft and disposed centrally about the axis, and slidably engaged to the rotation transmission shaft inside the hole, so that, upon rotation of the rotation transmission shaft, the rotation transmission shaft and the screw shaft rotate simultaneously about the axis; and
a motion transformation member connected to the frame member so as to be prevented from rotating about the axis, and having a bore disposed centrally about the axis so as to threadably engage with the outer cylindrical surface of the screw shaft inside the bore, so that the screw shaft is advanced and retracted when being rotated;
further comprising a guide bar connected to the frame member, and a driven member disposed at a second radial surface disposed opposite the first radial surface of the screw shaft and movable rectilinearly along the guide bar, so that the driven member is advanced and retracted without rotation when the screw shaft is advanced and retracted when being rotated.

20. A drive apparatus comprising:
a frame member;
a rotation transmission shaft extending along and centrally about an axis of rotation and rotatably mounted to the frame member;
a screw shaft having an outer cylindrical surface, coaxially disposed about the rotation transmission shaft, having a hole having a first opening on a first radial surface of the screw shaft and disposed centrally about the axis, and slidably engaged to the rotation transmission shaft inside the hole, so that, upon rotation of the rotation transmission shaft, the rotation transmission shaft and the screw shaft rotate simultaneously about the axis; and a motion transformation member connected to the frame member so as to be prevented from rotating about the axis, and having a bore disposed centrally about the axis so as to threadably engage with the outer cylindrical surface of the screw shaft inside the bore, so that the screw shaft is advanced and retracted when being rotated;
further comprising an encoder connected to the rotation transmission shaft and operative to detect rotation speed of the rotation transmission shaft.

21. An injection molding machine comprising:
a frame member;
a rotation transmission shaft extending along and centrally about an axis of rotation and rotatably mounted to the frame member;
a motor fixedly connected to the frame member and operative to rotate the rotation transmission shaft;
a screw shaft having an outer cylindrical surface, coaxially disposed about the rotation transmission shaft, having a hole having a first opening on a first radial surface of the screw shaft and disposed centrally about the axis, and slidably engaged to the rotation transmission shaft inside the hole, so that the rotation transmission shaft and the screw shaft rotate simultaneously about the axis upon activation of the motor; and
a motion transformation member connected to the frame member so as to be prevented from rotating about the axis, and having a bore disposed centrally about the axis so as to threadably engage with the outer cylindrical surface of the screw shaft inside the bore, so that the screw shaft is advanced and retracted when being rotated through the motion of the motor.

22. An injection molding machine comprising:
a frame member;
a rotation transmission shaft extending along and centrally about an axis of rotation and rotatably mounted to the frame member;
a motor fixedly connected to the frame member and operative to rotate the rotation transmission shaft;
a screw shaft having an outer cylindrical surface, coaxially disposed about the rotation transmission shaft, having a hole having a first opening on a first radial surface of the screw shaft and disposed centrally about the axis, and slidably engaged to the rotation transmission shaft inside the hole, so that the rotation transmission shaft and the screw shaft rotate simultaneously about the axis upon activation of the motor; and
a motion transformation member connected to the frame member so as to be prevented from rotating about the axis, and having a bore disposed centrally about the axis so as to threadably engage with the outer cylindrical surface of the screw shaft inside the bore, so that the screw shaft is advanced and retracted when being rotated
further comprising a guide bar connected to the frame member, and a driven member disposed at a second radial surface disposed opposite the first radial surface of the screw shaft and movable rectilinearly along the guide bar, so that the driven member is advanced and retracted without rotation when the screw shaft is advanced and retracted when being rotated.

23. An injection molding machine according to claim 22, further comprising a stationary platen spaced apart from the frame member, a plurality of tie rods which connects the frame member and the stationary platen, a movable platen movable rectilinearly along the tie rods, and a toggle mechanism which connects the driven member, the movable platen, and the frame member, so that the movable platen is advanced and retracted by extension and contraction of the toggle mechanism when the driven member is advanced and retracted.

24. An injection molding machine comprising:
a frame member;
a rotation transmission shaft extending along and centrally about an axis of rotation and rotatably mounted to the frame member;
a motor fixedly connected to the frame member and operative to rotate the rotation transmission shaft;
a screw shaft having an outer cylindrical surface, coaxially disposed about the rotation transmission shaft, having a hole having a first opening on a first radial surface of the screw shaft and disposed centrally about the axis, and slidably engaged to the rotation transmission shaft inside the hole, so that the rotation transmission shaft and the screw shaft rotate simultaneously about the axis upon activation of the motor; and
a motion transformation member connected to the frame member so as to be prevented from rotating about the axis, and having a bore disposed centrally about the axis so as to threadably engage with the outer cylindrical surface of the screw shaft inside the bore, so that the screw shaft is advanced and retracted when being rotated;
wherein the motor has a stator fixedly mounted to the motor, a rotor and a hollow output shaft coaxially and rotatably disposed along the rotation transmission shaft, the rotation transmission shaft is fixed to the hollow output shaft and disposed inside the hollow output shaft, so that the rotation transmission shaft and the hollow output shaft rotate simultaneously about the axis upon activation of the motor.

25. An injection molding machine according to claim 21, wherein the hole of the screw shaft is defined by an inner cylindrical surface which extends into the screw shaft along the axis from the first radial surface, the screw shaft includes inner splines extending along the axis on the inner cylindrical surface of the hole, and the rotation transmission shaft includes outer spines along the axis on an outer surface thereof, the inner splines of the screw shaft and the outer splines of the rotation transmission shaft being in slidable and matable engagement with each other.

26. An injection molding machine to claim 25, wherein the inner splines of the screw shaft are formed on the inner cylindrical surface of the hole near the first radial surface of the screw shaft.

27. An injection molding machine according to claim 21, wherein the outer cylindrical surface of the screw shaft is formed with exterior spiral threads, and the bore of the motion transformation member is defined by an interior surface formed with interior spiral threads, the exterior spiral threads of the screw shaft and the interior spiral threads of the motion transmission member being in matable engagement with each other.

28. An injection molding machine according to claim 21, wherein the hole extends through the screw shaft and has a second opening on a second radial surface disposed opposite the first radial surface.

29. An injection molding machine according to claim 21, wherein the motion transformation member is fixed to the frame member.

30. An injection molding machine comprising:
a frame member;
a rotation transmission shaft extending along and centrally about an axis of rotation and rotatably mounted to the frame member;
a motor fixedly connected to the frame member and operative to rotate the rotation transmission shaft;
a screw shaft having an outer cylindrical surface, coaxially disposed about the rotation transmission shaft, having a hole having a first opening on a first radial surface of the screw shaft and disposed centrally about the axis, and slidably engaged to the rotation transmission shaft inside the hole, so that the rotation transmission shaft and the screw shaft rotate simultaneously about the axis upon activation of the motor; and
a motion transformation member connected to the frame member so as to be prevented from rotating about the axis, and having a bore disposed centrally about the axis so as to threadably engage with the outer cylindrical surface of the screw shaft inside the bore, so that the screw shaft is advanced and retracted when being rotated;
further comprising an encoder connected to the rotation transmission shaft and operative to detect rotation speed of the rotation transmission shaft.

31. An injection molding machine, comprising:
(a) a frame member;
(b) a rotation transmission shaft extending along and centrally about an axis of rotation and rotatably mounted to the frame member;
(c) a screw shaft coaxially disposed with respect to the rotation transmission shaft, and slidably engaged to the rotation transmission shaft, so that upon rotation of the rotation transmission shaft, the rotation transmission shaft and the screw shaft rotate simultaneously about the axis;
(d) and a transmission member connected to the frame member so as to be prevented from rotating about the axis, and having a bore disposed centrally about the axis so as to threadably engage with an outer cylindrical surface of the screw shaft inside the bore,
(e) so that the screw shaft is advanced and retracted when being rotated through the motion of the rotation transmission shaft.

32. A drive apparatus according to claim 31, wherein the rotation transmission shaft and the screw shaft are overlapped in an axial direction.

33. A drive apparatus according to claim 32, wherein an inner cylindrical surface of the screw shaft is engaged with the outer cylindrical surface of the rotation transmission shaft.

34. A drive apparatus according to claim 32, wherein the screw shaft has a hole having a first opening on a first radial surface of the screw shaft and disposed centrally about the axis.

35. A drive apparatus according to claim 31, further comprising a motor fixedly connected to the frame member and operative to rotate the rotation transmission shaft.

* * * * *